(12) United States Patent　　　　　(10) Patent No.: US 12,674,767 B2

Oudrhiri et al.　　　　　　　　　　　(45) Date of Patent: Jul. 7, 2026

(54) SYSTEMS AND METHODS FOR HIGH-RESOLUTION SOIL AND VEGETATION MOISTURE CONTENT MONITORING USING FULL POLARIMETRIC GLOBAL NAVIGATION SATELLITE SYSTEM (GNSS) SIGNALS

(71) Applicant: California Institute of Technology, Pasadena, CA (US)

(72) Inventors: Kamal Oudrhiri, Pasadena, CA (US); Javier Bosch-Lluis, Pasadena, CA (US); Nereida Rodriguez Alvarez, Pasadena, CA (US); Joan F. Munoz, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 309 days.

(21) Appl. No.: 18/508,996

(22) Filed: Nov. 14, 2023

(65) Prior Publication Data

US 2024/0159688 A1　　　May 16, 2024

Related U.S. Application Data

(60) Provisional application No. 63/425,067, filed on Nov. 14, 2022.

(51) Int. Cl.
*G01N 22/04*　　　(2006.01)
(52) U.S. Cl.
CPC ................................... *G01N 22/04* (2013.01)
(58) Field of Classification Search
CPC ............................... G01N 22/04; G01N 33/24
See application file for complete search history.

(56) References Cited

U.S. PATENT DOCUMENTS 6,122,404 A　　9/2000　Barter et al.
12,332,359 B2　6/2025　Tapucu et al.
(Continued)

FOREIGN PATENT DOCUMENTS

CN　　106290408 A　*　1/2017　............ G01N 23/00
CN　　112488008 A　*　3/2021　............ G06F 18/25
(Continued)

OTHER PUBLICATIONS

English translate of CN112488008A (Year: 2021).*
(Continued)

*Primary Examiner* — Eman A Alkafawi
*Assistant Examiner* — Courtney G Mcdonnough
(74) *Attorney, Agent, or Firm* — KPPB LLP

(57)　　　　　　　　ABSTRACT

One embodiment includes a system for moisture content detection and surface evaluation, including a set of one or more antennas, a radiometer, a reflectometer, a set of one or more cameras, a Global Navigation Satellite System receiver, a memory containing an evaluation application, and a processor including a set of one or more processors, wherein the evaluation application configures the processors to evaluate a surface underneath the system by performing the steps of obtaining a plurality of measurements using the radiometer, the reflectometer, and the set of one or more cameras, obtaining a set of one or more observables based on the plurality of measurements; at a high spatial resolution, generating a set of one or more environmental products based on at least one observable from the set of one or more observables, and displaying the set of one or more environmental products on a graphical user interface.

24 Claims, 7 Drawing Sheets

Pol 1/Pol 2 can be any combination of orthogonal polarizations: RHCP/LHCP or H/V.

(56) References Cited

U.S. PATENT DOCUMENTS

2021/0148811 A1   5/2021   Shaw et al.
2024/0134061 A1   4/2024   Oudrhiri et al.

FOREIGN PATENT DOCUMENTS

| | | | |
|---|---|---|---|
| CN | 111024076 B | 4/2022 | |
| CN | 114894312 A | 8/2022 | |
| WO | WO-2008049948 A2 * | 5/2008 | ............ G01J 5/0003 |
| WO | WO-2014129966 A1 * | 8/2014 | ............ G01D 9/005 |
| WO | WO-2021094753 A1 * | 5/2021 | ........... G01S 19/073 |

OTHER PUBLICATIONS

English translate of CN 106290408 A (Year: 2017).*
English translate of WO 2008049948 A2 (Year: 2008).*
English translation CN112488008A (Year: 2021).*
"CYGNSS Level 1 Science Data Record Version 3.0", PO.DAAC/ JPL/NASA, retrieved from internet: https://doi.org/10.5067/CYGNS-L1X30, Retrieved on Nov. 19, 2025, 1 pg.
"NASA Earthdata", Retrieved from internet: https://www.earthdata.nasa.gov/, Retrieved on Nov. 19, 2025, 7 pgs.
Bosch-Lluis et al., "The Use of Polarimetric GNSS-Reflectometry for Deforestation and Forest Degradation", IGARSS 2023-2023 IEEE International Geoscience and Remote Sensing Symposium, 2023, 18 pgs.
Brisco et al., "Hybrid Compact Polarimetric SAR for Environmental Monitoring with the RADARSAT Constellation Mission", Remote Sensing, vol. 12, No. 20, Article 3283, Oct. 9, 2020, 20 pgs., doi: 10.3390/rs12203283.
Carreno-Luengo et al., "Spaceborne GNSS-R from the SMAP Mission: First Assessment of Polarimetric Scatterometry over Land and Cryosphere", Remote Sensing, vol. 9, No. 4, Article 362, Apr. 12, 2017, 23 pgs., doi: 10.3390/rs9040362.
Chan et al., "Ancillary Data Report: Vegetation Water Content", Soil Moisture Active Passive (SMAP), Document No. 047, JPL D-53061, Jan. 21, 2013, 18 pgs.
Chaubell et al., "Smap L3 Radiometer Global Daily 36 km EASE-Grid Soil Moisture, Version 8", National Snow and Ice Data Center, Distributed Active Archive Center, Boulder, Colorado USA, 2021, 34 pgs., doi: 10.5067/OMHVSRGFX38O.
Chew et al., "Description of the UCAR/CU Soil Moisture Product", Remote Sensing, vol. 12, No. 10, Article 1558, May 14, 2020, 26 pgs., doi: 10.3390/rs12101558.
Entekhabi et al., "SMAP Handbook-Soil Moisture Active Passive: Mapping Soil Moisture and Freeze/Thaw from Space", Retrieved from internet: https://smap.jpl.nasa.gov/files/smap2/SMAP_Handbook_FINAL_1_JULY_2014_Web.pdf, Retrieved on Nov. 19, 2025, 192 pgs.
Gleason et al., "The CYGNSS Level 1 Calibration Algorithm and Error Analysis Based on On-Orbit Measurements", IEEE Journal of Selected Topics in Applied Earth Observations and Remote Sensing, vol. 12, No. 1, Jan. 2019, pp. 37-49, doi: 10.1109/JSTARS.2018. 2832981.
Guissard, "Mueller and Kennaugh Matrices in Radar Polarimetry", IEEE Transactions on Geoscience and Remote Sensing, vol. 32, No. 3, May 1994, pp. 590-597, doi: 10.1109/36.297977.
Marquis et al., "The GPS Block IIR and IIR-M Broadcast L-band Antenna Panel: Its Pattern and Performance", Navigation: Journal of The Institute of Navigation, vol. 62, No. 4, 2015, pp. 329-347, doi: 10.1002/navi. 123.
Munoz-Martin et al., "Analysis of polarimetric GNSS-R Stokes parameters of the Earth's land surface", Remote Sensing of Environment, vol. 287, Article 113491, Mar. 15, 2023, 14 pgs., doi: 10.1016/j.rse.2023.113491.

Munoz-Martin et al., "Calibration Strategy for Compact Polarimetric GNSS-R Instruments", IEEE Transactions on Geoscience and Remote Sensing, vol. 61, Apr. 13, 2023, 13 pgs., doi: 10.1109/TGRS.2023. 3266602.
Munoz-Martin et al., "Effective Surface Roughness Impact in Polarimetric GNSS-R Soil Moisture Retrievals", Remote Sensing, vol. 15, No. 8, Apr. 11, 2013, 20 pgs., doi: 10.3390/rs15082013.
Munoz-Martin et al., "Stokes Parameters Retrieval and Calibration of Hybrid Compact Polarimetric GNSS-R Signals", IEEE Transactions on Geoscience and Remote Sensing, vol. 60, Article 5113911, May 27, 2022, 11 pgs., doi: 10.1109/TGRS.2022.3178578.
Nord et al., "Comparison of Compact Polarimetric Synthetic Aperture Radar Modes", IEEE Transactions on Geoscience and Remote Sensing, vol. 47, No. 1, Jan. 2009, pp. 174-188, doi: 10.1109/TGRS. 2008.2000925.
Piepmeier et al., "SMAP L-Band Microwave Radiometer: Instrument Design and First Year on Orbit", IEEE Transactions on Geoscience and Remote Sensing, vol. 55, No. 4, Apr. 2017, pp. 1954-1966, doi: 10.1109/TGRS.2016.2631978.
Raney, "Hybrid-Polarity SAR Architecture", IEEE Transactions on Geoscience and Remote Sensing, vol. 45, No. 11, Nov. 2007, pp. 3397-3404, doi: 10.1109/TGRS.2007.895883.
Raney et al., "RADARSAT Constellation Mission's Operational Polarimetric Modes: A User-Driven Radar Architecture", Canadian Journal of Remote Sensing, vol. 47, No. 1, 2021, 16 pgs., doi: 10.1080/07038992.2021.1907566.
Rodriguez-Alvarez et al., "Classifying Inundation in a Tropical Wetlands Complex with GNSS-R", Remote Sensing, vol. 11, No. 9, Article 1053, May 4, 2019, 24 pgs., doi: 10.3390/rs11091053.
Rodriguez-Alvarez et al., "The first polarimetric GNSS-Reflectometer instrument in space improves the SMAP mission's sensitivity over densely vegetated areas", Scientific Reports, vol. 13, Article 3722, Mar. 2023, 12 pgs., doi; 10.1038/s41598-023-30805-7.
RUF, "CYGNSS handbook Cyclone Global Navigation Satellite System: Deriving surface wind speeds in tropical cyclones", National Aeronautics and Space Administration (NASA), Retrieved from internet: https://isulibrary.isunet.edu/index.php?lvl=notice_display &id=10295, retrieved on Nov. 19, 2025, 1 pg.
Senyurek et al., "Spatial and Temporal Interpolation of CYGNSS Soil Moisture Estimations", IEEE International Geoscience and Remote Sensing Symposium IGARSS, Brussels, Belgium, 2021, pp. 6307-6310, doi: 10.1109/IGARSS47720.2021.9553900.
SMAP Algorithm Development Tea, "Ancillary Data Report: Surface Temperature", Soil Moisture Active Passive (SMAP), Science Document No. 051, JPL D-53064, Mar. 3, 2015, 19 pgs.
Souissi et al., "Investigation of the capability of the Compact Polarimetry mode to Reconstruct Full Polarimetry mode using RADARSAT2 data", Advanced Electromagnetics, vol. 1, No. 1, May 2012, pp. 19-28, doi: 10.7716/aem.v1i1.12.
Tomar et al., "Evaluation of Hybrid Polarimetric Decomposition Techniques for Forest Biomass Estimation", IEEE Journal of Selected Topics in Applied Earth Observations and Remote Sensing, vol. 12, No. 10, Oct. 2019, pp. 3712-3718, doi: 10.1109/JSTARS.2019. 2947088.
Ulaby et al., "Radar Polaritnetry for Geoscience Application", Geocarto International, vol. 5, No. 3, 1990, p. 38, doi: 10.1080/ 10106049009354274.
Wang et al., "Three-Component Decomposition Based on Stokes Vector for Compact Polarimetric SAR", Sensors, vol. 15, No. 9, Sep. 18, 2015, pp. 24087-24108, doi: 10.3390/s150924087.
Zavorotny et al., "Scattering of GPS Signals from the Ocean with Wind Remote Sensing Application", IEEE Transactions on Geoscience and Remote Sensing, vol. 38, No. 2, Mar. 2000, pp. 951-964, doi: 10.1109/36.841977.

* cited by examiner

| Stage | Topic Contribution | Measurement | Observable | Product |
|---|---|---|---|---|
| Pre | Fuel moisture | L-band $T_b$, Polarimetric DDM, Multispectral imagery, Thermal imagery | SM, VWC | BF, FRI |
| | Soil moisture | L-band $T_b$, Polarimetric DDM, Multispectral imagery, Thermal imagery | SM | SMC, FRI |
| | Forest composition, canopy and health | Polarimetric DDM, Multispectral imagery | NDVI, Roughness, Volume scattering | BF |
| | Organic debris | Polarimetric DDM, Multispectral imagery | Roughness, Volume scattering, NDVI | BF |
| During | Early detection and characterization of fire | L-band $T_b$, Polarimetric DDM, Multispectral imagery, Thermal imagery | Canopy temperature, SM, VWC | FRI |
| | Improved data products and improved methods for product distribution for fire managers | L-band $T_b$, Polarimetric DDM, Multispectral imagery, Thermal imagery | SM, VWC, NDVI, Roughness, Reflectivity, Volume scattering, Canopy temperature | SMC, BF, FRI |
| | Improved modeling of the active fire environment | L-band $T_b$, Polarimetric DDM, Multispectral imagery, Thermal imagery | SM, VWC, NDVI, Roughness, Reflectivity, Volume scattering, Canopy temperature | SMC, BF, FRI |
| Post | Change in the vegetation state | Polarimetric DDM, Multispectral imagery | VWC, NDVI | BF |
| | Landslides | Polarimetric DDM | Roughness | TC |
| | Floods – runoff burn scars | Polarimetric DDM | Reflectivity, Volume scattering | TC |
| | Impacts to watersheds | Polarimetric DDM | Roughness, Reflectivity, Volume scattering | TC |
| | Effective vegetative restoration | L-band $T_b$, Polarimetric DDM, Multispectral imagery, Thermal imagery | VWC, NDVI, SM | BF |

*FIG. 2*

SYSTEMS AND METHODS FOR HIGH-RESOLUTION SOIL AND VEGETATION MOISTURE CONTENT MONITORING USING FULL POLARIMETRIC GLOBAL NAVIGATION SATELLITE SYSTEM (GNSS) SIGNALS

CROSS-REFERENCE TO RELATED APPLICATIONS

The current application claims the benefit of and priority under 35 U.S.C. § 119(e) to U.S. Provisional Patent Application No. 63/425,067 entitled "Moisture Content and Calibration (MC2) System" filed Nov. 14, 2022. The disclosure of U.S. Provisional Patent Application No. 63/425,067 is hereby incorporated by reference in its entirety for all purposes.

STATEMENT OF FEDERAL SUPPORT

This invention was made with government support under Grant No. 80NMO0018D0004 awarded by NASA (JPL). The government has certain rights in the invention.

FIELD OF THE INVENTION

The present invention generally relates to remote sensing using Global Navigation Satellite System (GNSS).

BACKGROUND

Navigation is the process of determining the position and direction of a vehicle or object in motion. Satellite navigation, in particular, refers to the use of orbiting satellites as reference points to determine the precise location and movement of objects on the Earth's surface or in space. One of the most widely used navigation systems is the Global Positioning System (GPS), which uses a network of satellites to provide positioning, navigation, and timing information to users worldwide. Other navigation satellite systems similar to GPS are Galileo (E.U.), BEIDOU (China), and GLO-NASS (Russian Federation), among others. All these systems are known as Global Navigation Satellite Systems (GNSS). GPS, and GNSS in general, has become an essential tool for a variety of industries, including aviation, maritime, transportation, and emergency services, among others. With the growing demand for accurate and reliable navigation, there is an ongoing need to improve GPS technologies and explore new approaches to satellite navigation. GNSS systems enable a wide range of applications, from guiding a car to a destination to tracking the movement of ships, aircraft, and even humans.

GNSS Reflectometry (GNSS-R) is a remote sensing technique with a bistatic radar configuration that uses signals from GNSS as a source of radiation to study the properties of the surfaces where the signal reflects. GNSS-R has been applied to a wide range of applications, such as sea surface height, soil moisture, and vegetation biomass estimation. In this method, GNSS signals reflect off of a surface, and the reflected signals are received by a GNSS receiver. The properties of the reflected signals are then analyzed to extract information about the reflecting surface. The advantage of GNSS-R is that it utilizes existing GNSS infrastructure and requires only a simple receiver, making it a low-cost and efficient remote sensing technique.

Soil moisture detection is an important aspect of agriculture, environmental monitoring, and climate research. The amount of water in the soil can affect plant growth, crop yield, and the overall health of ecosystems. Accurate measurement of soil moisture can be crucial for optimizing irrigation, reducing water waste, and predicting droughts or floods. Soil moisture also plays a significant role in weather patterns and climate change, making it an important parameter for climate modeling and forecasting. Therefore, developing robust and efficient methods for soil moisture detection can be important for sustainable agriculture and environmental management.

SUMMARY OF THE INVENTION

Systems and methods for high-resolution soil and vegetation moisture content monitoring using full polarimetric Global Navigation Satellite System (GNSS) signals in accordance with embodiments of the invention are illustrated. One embodiment includes a system for high-resolution moisture content detection and surface evaluation. The system includes a set of one or more antennas, a radiometer, a reflectometer, a set of one or more cameras, and a Global Navigation Satellite System (GNSS) receiver. The system further includes a memory containing an evaluation application, and a processor including a set of one or more processors, wherein the evaluation application configures the set of one or more processors to evaluate a surface underneath the system by performing the steps of obtaining a plurality of measurements using the radiometer, the reflectometer, and the set of one or more cameras, obtaining a set of one or more observables based on the plurality of measurements; at a high spatial resolution, generating a set of one or more environmental products based on at least one observable from the set of one or more observables, and displaying the set of one or more environmental products on a graphical user interface (GUI).

In a further embodiment, the radiometer is an L-band radiometer centered at 1.413 GHz.

In still another embodiment, the reflectometer is a full polarimetric multi-band GNSS reflectometer that receives signals in the L1, L2, and L5 GPS bands, and E1 and E5 Galileo bands.

In a still further embodiment, the set of one or more cameras are multi-spectral cameras with sensitivities at 550 nm, 660 nm, 735 nm, and 790 nm bands.

In yet another embodiment, the obtaining of the plurality of measurements includes receiving Global Navigation Satellite System Reflectometry (GNSS-R) signals reflected off of the surface.

In a yet further embodiment, obtaining the set of one or more observables further includes computing Delay Doppler Maps of both polarizations of received GNSS-R signals.

In another additional embodiment, wherein the set of one or more antennas includes a right-hand circular polarization (RHCP) active antenna for positioning and calibration, and a Dual Polarized Antenna to receive GNSS-R signals.

In a further additional embodiment, the radiometer further includes a digital backend comprising an 8-channel poly-phase filter bank with a channel bandwidth from 1 to 4 MHz.

In another embodiment again, the radiometer is calibrated using a single pole three throws (SP3T) switch commuting method.

In a further embodiment again, further comprising a software-defined radio (SDR) board that demodulates received GNSS-R signals using in-phase/quadrature (I/Q) demodulation.

In still yet another embodiment, the observables of the surface includes at least one observable selected from the group consisting of: soil moisture (SM), normalized difference vegetation index (NDVI), vegetation water content (VWC), surface roughness, volume scattering, reflectivity, signal coherency, and canopy temperature.

In still another additional embodiment, the environmental products include at least one selected from the group consisting of: soil moisture condition (SMC), biomass fuel (BF), terrain classification (TC), and fire risk index (FRI).

In a still further additional embodiment, the radiometer brightness temperature measurements are calibrated using a two-load calibration procedure.

In still another embodiment again, the NDVI and VWC are computed based on measurements from the set of one or more cameras.

In a yet further additional embodiment, the volume scattering and signal coherency is computed based on four Stokes parameters of the received GNSS-R signals.

In yet another embodiment again, the surface roughness can be computed by minimizing a semi-empirical model applied to received polarimetric GNSS-R data.

In a yet further embodiment again, the SM is computed by minimizing the difference between the ratio of polarimetric GNSS-R components and the ratio of Fresnel reflection coefficients modeled using a soil dielectric model.

In another additional embodiment again, the FRI is computed by fitting the SMC, BF, and TC in a non-linear regression.

In a further additional embodiment again, a high spatial resolution SM map is obtained by solving the Tau-Omega model.

In still yet another additional embodiment, at least one of the measured emission, processed GNSS-R signals, infrared data, and the position is further processed by a separate processor.

In still yet another further additional embodiment, the set of one or more antennas are nadir-looking planar antenna arrays.

In still yet another additional embodiment again, the boresight maxima of the antennas covers reflections coming from incidence angles from 35° to 55°.

One embodiment includes a system for detecting moisture content of a surface. The system includes a set of one or more antennas configured to receive GNSS-R signals reflected off of the surface, a radiometer configured to measure emissions of the surface, a reflectometer configured to process the received GNSS-R signals, a set of one or more cameras configured to obtain infrared data of the surface, and a GNSS receiver configured to position the system based on received GNSS signals.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

FIG. 2 illustrates various observables and products that may be obtained using a Moisture Content and Calibration (MC2) system in accordance with an embodiment of the invention.

DETAILED DESCRIPTION

Figure 1:
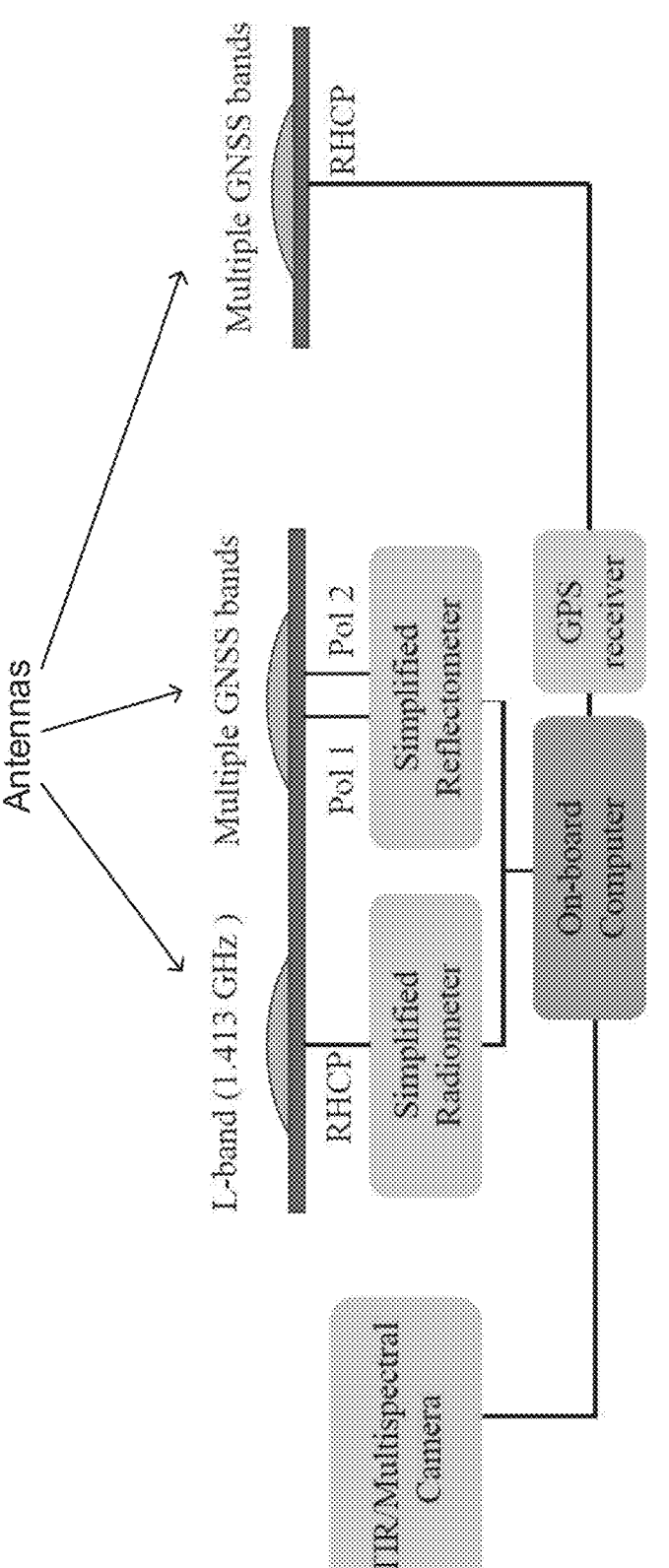
FIG. 1 illustrates a block diagram of a miniaturized remote sensing system in accordance with an embodiment of the invention.

The study of Earth's environment is of utmost importance. The environment is a multifaceted entity that encompasses the Earth's atmosphere, oceans, land, and biosphere. It is affected by natural phenomena such as weather patterns, climate change, and geological events, as well as human activities such as agriculture, transportation, and industrialization. By studying the environment, scientists can gain valuable insights into the complex interactions between these factors and develop strategies to mitigate the negative impacts of human activities on the planet. Ultimately, understanding the environment is crucial for maintaining a healthy and habitable planet for future generations.

In recent years, there has been a growing interest in monitoring and studying the Earth's environment using remote sensing technologies. These technologies can enable scientists to gain a better understanding of various environmental parameters, such as soil moisture, vegetation biomass, sea surface height, and atmospheric conditions, among others. Remote sensing techniques that utilize satellite data have become increasingly popular due to their ability to provide frequent and high-resolution measurements of these parameters. For example, satellite imaging can be an effective tool for obtaining insight into the Earth's environment. The data obtained from these remote sensing technologies can be used to inform decision-making processes related to agriculture, water management, disaster response, and climate change mitigation.

Global Navigation Satellite System (GNSS) is a very powerful and accurate navigation system. It uses a network of satellites orbiting the Earth to transmit radio signals. GNSS signals have been utilized in remote sensing systems for studying the Earth's environment. As GNSS signals are transmitted from GNSS satellites orbiting the Earth, the transmitted signals reflect off of the Earth's surface. These reflected signals can provide much information about the reflecting surface. This is known as GNSS Reflectometry (GNSS-R), which is a remote sensing technique that uses surface-reflected GNSS signals to infer information and study the Earth's surface. The reflected signals can be referred to as GNSS-R signals. As a transmitted GNSS signal is reflected off of the Earth's surface, the scatterings of the reflected signal can contain information on the reflecting surface derived based on the transmitted signal's interaction with the surface. GNSS-R signals thus can be used to infer information such as surface soil moisture, surface roughness, wind speed over the ocean surface, and density of vegetation on the reflecting surface.

Even though GNSS-R signals can provide insight into the Earth's surface and environment, it can be difficult to collect the GNSS-R signals sufficiently to derive meaningful measurements. GNSS-R signals may scatter in different directions upon contact with a reflecting surface, and this scattering effect can be enhanced in environments such as densely wooded areas that present some very uneven surfaces. Moreover, the polarization of GNSS signals may change depending on the properties of the reflecting surface. Without knowing these key pieces of information, it can be very difficult to make the relevant computation necessary to even consider harnessing GNSS-R signals to study the Earth.

Over the years, various types of remote sensing techniques utilizing combinations of satellite imaging and radar have been employed to study Earth's soil water content, or soil moisture. However, current remote sensing technologies are limited in a number of ways, such as their unwieldiness and lower spatial resolution in imaging. For example, L-band (between 1.2 GHz and 1.45 GHz) radars and radiometers require a large antenna and high power requirements to provide accurate and high-resolution measurements. In particular, radars such as uninhabited aerial vehicle synthetic aperture radars (UAVSAR), while capable of producing high-resolution radar images for computing soil moisture, weigh over 230 kilograms. These size and weight restrictions make it difficult to deploy these radars and radiometers in current aerial vehicles. Additionally, while there are existing remote sensing instruments that are compatible with aerial vehicles, these instruments are typically deployed in individual pieces. Without conducting measurements concurrently, the potential error in data assessment can be large. Current radars may also be affected by limited soil moisture sensitivity in dense forests. On the visible imaging front (e.g., cameras), image availability may be dependent on weather and illumination, both of which are difficult to control in the environment. These limitations in current remote sensing systems can make remote sensing for environmental purposes difficult.

Systems and methods in accordance with many embodiments of the invention can attempt to remedy the above limitations by providing a comprehensive suite of miniaturized instruments capable of passive remote sensing. In many embodiments, the suite of instruments has a low power consumption level and can be implemented on current aerial vehicles to perform passive remote sensing in the air. In numerous embodiments, systems are able to process data captured by each instrument and integrate data from each data source to produce outputs in real time using a multi-sensor fusion algorithm. By combining data from multiple data sources, systems can provide for imaging and observables with higher levels of spatial resolution, which may be adjustable with altitude. In numerous embodiments, systems generate intermediate results. Intermediate results may be different geophysical observables such as soil moisture and vegetation water content. In many embodiments, systems output geophysical products derived from geophysical observables. In several embodiments, systems include a real-time visualization tool that can provide graphical user interfaces to display the observables and products. Systems can provide accurate visualization along with essential information that can assist with solving problems including wildfires, floods, and droughts. Depending on the timing of deployment, systems are able to monitor and provide feedback on all stages of a potential natural disaster and help with reducing the effects of hazardous events on the world's population, infrastructure, and agriculture.

In numerous embodiments, systems are able to collect GNSS-R signals and their corresponding scattering coefficients. Systems can calibrate GNSS-R signals and utilize the calibrated signals for improved measurements. In many embodiments, systems leverage the polarimetric processing approach of hybrid compact polarimetry (HCP) to measure reflected GNSS signals and obtain Stokes parameters based on the measurements. Systems can extract Stokes parameters and other relevant information of reflected GNSS signals to analyze the environmental parameters of Earth. HCP GNSS systems are able to calibrate and process GNSS signals more accurately through a polarimetric approach. HCP GNSS can operate in urban canyons, forests, and other environments where a direct line of sight to GNSS satellites is obstructed. HCP GNSS-R measurements can provide valuable information on soil moisture, vegetation cover, soil surface roughness, frozen and thawed states of the landscapes, flooding, wetlands, and other land water bodies dynamics, ocean wind speed, ocean wave height, presence of algae and oil surfactants on the ocean surface, sea ice presence, concentration, thickness, and types. This makes HCP GNSS-R useful for a wide range of scientific and commercial applications, such as weather forecasting, maritime navigation, and climate change research.

In several embodiments, systems are able to process combined data from Soil Moisture Active Passive (SMAP), Cyclone Global Navigation Satellite System (CYGNSS), Moderate Resolution Imaging Spectroradiometer (MODIS), and Landsat, which can be co-located and obtained near the surface at an adequate spatial resolution. Systems are capable of supporting implementations on aerial vehicles and suborbital platforms, providing soil moisture conditions (SMC), biomass fuel (BF), terrain classification (TC), and fire risk indices (FRI) maps. In some embodiments, systems can enable more accurate fire risk assessment and further decision-making during pre-, active, and post-fire activities.

Moisture Content and Calibration (MC2) System

To study the Earth's surface, remote sensing instruments should be positioned appropriately to obtain accurate data of the Earth's surface. This often means that measurement instruments are implemented on aerial vehicles that will fly over areas of interest to record data. These circumstances may generally require remote sensing instruments to be miniaturized to fit the weight, dimensions, and power consumption limitations of deployment in aerial vehicles while still being able to output the necessary observables, such as the soil moisture and vegetation water content conditions of particular areas. FIG. 1 illustrates a block diagram of a miniaturized remote sensing system, hereinafter referred to as the MC2 system, in accordance with an embodiment of the invention. In many embodiments, MC2 systems include at least three independent antennas, a radiometer, a reflectometer, and a thermal infrared near-infrared (TIR-NIR) camera. The antennas may be connected to the radiometer and reflectometer to process the signals collected by the antennas. In several embodiments, the antennas include two nadir-looking antennas configured to collect the GNSS-R and radiometry observables and one zenith-looking antenna for positioning and GNSS-R calibration purposes.

In many embodiments, the GNSS-R nadir-looking antennas are planar antenna arrays. The boresight maxima of the nadir-looking antennas can cover reflections coming from incidence angles from 35° to 55°. The single-element antenna connected to the reflectometer may be a dual linearly polarized patch. In selected embodiments, the L-band radiometer antenna is a planar antenna array with boresight in the nadir-looking direction. The array can comprise nine elements, giving a 3-dB beamwidth of 35° by 35°. This antenna setup can provide a footprint resolution between 250 m and 800 m for flight altitudes between 1 and 3 km, respectively. The GNSS receiving antenna may be an aircraft-approved commercial-grade off-the-shelf GNSS antenna for aviation use.

Although a specific configuration of a GNSS-R antenna is illustrated in this figure, any of a variety of configurations can be utilized as the GNSS-R antenna to receive GNSS-R signals similar to those described herein, and the specific antenna configuration that is utilized will largely be dependent upon the requirements of specific applications in accordance with embodiments of the invention.

Radiometers, reflectometers, and TIR-NIR cameras may be connected to a common front-end and processing unit. In several embodiments, MC2 systems include a GPS receiver for positioning MC2 systems or aerial vehicles carrying MC2 systems. In many embodiments, GPS receivers can calibrate the position of the MC2 system or the aerial vehicle carrying the MC2 system by gathering GNSS satellite positions, GNSS satellite pseudo-range, GNSS satellite Doppler, and/or receiver position velocity time (PVT). In some embodiments, the reflectometer is a full polarimetric multi-band GNSS reflectometer capable of receiving signals in the L1/L2/L5 GPS bands and E1/E5 Galileo band. Radiometers may be L-band radiometers centered at 1.413 GHz.

Although a specific configuration of radiometer, reflector, and TIR-NIR cameras is illustrated in this figure, any of a variety of configurations can be utilized, and the specific radiometer, reflector, and TIR-NIR configuration that is utilized will largely be dependent upon the requirements of specific applications in accordance with embodiments of the invention.

In some embodiments, systems include multi-spectral cameras with sensitivities at the Green (550 nm), Red (660 nm), Red-Edge (735 nm), and Near Infrared (790 nm) bands with a 40 nm bandwidth. The total field of view may be 49°×62° distributed in 1280×960 pixels. The multi-spectral camera may be a commercial off-the-shelf product, such as "Parrot Sequoia+" or "MicaSense Altum-PT." Systems may include thermal infrared cameras operating in the 7.5-13.5 μm band, providing 640×512 px within the same field of view as the multi-spectral camera. In selected embodiments, the thermal infrared camera may be commercially available thermal infrared cameras such as "FLIR Vue Pro" or "MicaSense Altum-PT."

Although a specific configuration of a TIR-NIR camera is illustrated in this figure, any of a variety of configurations can be utilized, and the specific camera configuration that is utilized will largely be dependent upon the requirements of specific applications in accordance with embodiments of the invention.

In many embodiments, systems include processing units to process the received signals. In certain embodiments, the processing unit is a combined field programmable gate array (FPGA) with an embedded microprocessor. In many embodiments, the FPGA is connected to an analog-to-digital converter (ADC) to sample the radiometry and reflectometry data. The FPGA fabric can generate the GNSS-R observables such as Delay Doppler Maps (DDMs) at two polarizations based upon the received GNSS-R signals. GNSS-R observables can be used to compute Stokes parameters of the received GNSS-R signals at 1 Hz and the generation of the integrated radiometric power at 100 Hz. In several embodiments, the embedded ARM microprocessor is used to sample and integrate the radiometry and reflectometry products from the FPGA module. The microprocessor can interface with the GNSS receiver and the optical imagers.

Although a specific configuration of a processing unit is illustrated in this figure, any of a variety of configurations can be utilized, and the specific processing unit configuration that is utilized will largely be dependent upon the requirements of specific applications in accordance with embodiments of the invention.

FIG. 2 illustrates various observables and products that may be obtained using MC2 in accordance with an embodiment of the invention. FIG. 2 provides the relationships between various measurements, observables, and products, which can serve as a guideline in the analysis of any surface region. Polarimetric DDMs obtained at 1 Hz can be processed to generate higher-order products, as illustrated in FIG. 2. Radiometry data at 100 Hz can be radiometrically calibrated and averaged into 2 Hz samples. In many embodiments, passive microwave measurements, multi-spectral and thermal images are geo-referenced using the GNSS receiver information.

As MC2 systems are capable of passive remote sensing, in certain embodiments, MC2 systems may operate as only a receiver without any active transmitter. MC2 systems may collect radiometric measurements using the radiometer and forward scattered GNSS-R signals using the reflectometer. The radiometric and reflectometric measurements can provide information on both soil moisture and vegetation water content information. In some embodiments, MC2 systems can obtain green, red, red edge, and near-infrared (RGB-NIR) measurements, which may be used to obtain observables such as normalized difference vegetation index (NDVI) of areas of interest. MC2 systems can further obtain TIR measurements, which can provide soil surface temperature.

Although specific relationships between observables and products are illustrated in this figure, any of a variety of relationships can be utilized, and the specific relationships that are utilized will largely be dependent upon the requirements of specific applications in accordance with embodiments of the invention.

Measurements illustrated in FIG. 2 can provide the relevant information on the observed surface, which may be used for further analysis to determine an optimal solution in situations such as wildfires, floods, droughts, and/or irrigation needs in agricultural areas. By identifying areas at risk and surveying those areas with a suite of measurement instruments, MC2 systems can provide strategic geophysical information at an adequate spatial resolution and coverage. In some embodiments, strategic geophysical information can be used to produce maps of fire risk and flood risk, as well as drought conditions and agricultural assessments (crop health, irrigation deficiencies, estimated crop yield).

Figure 3:
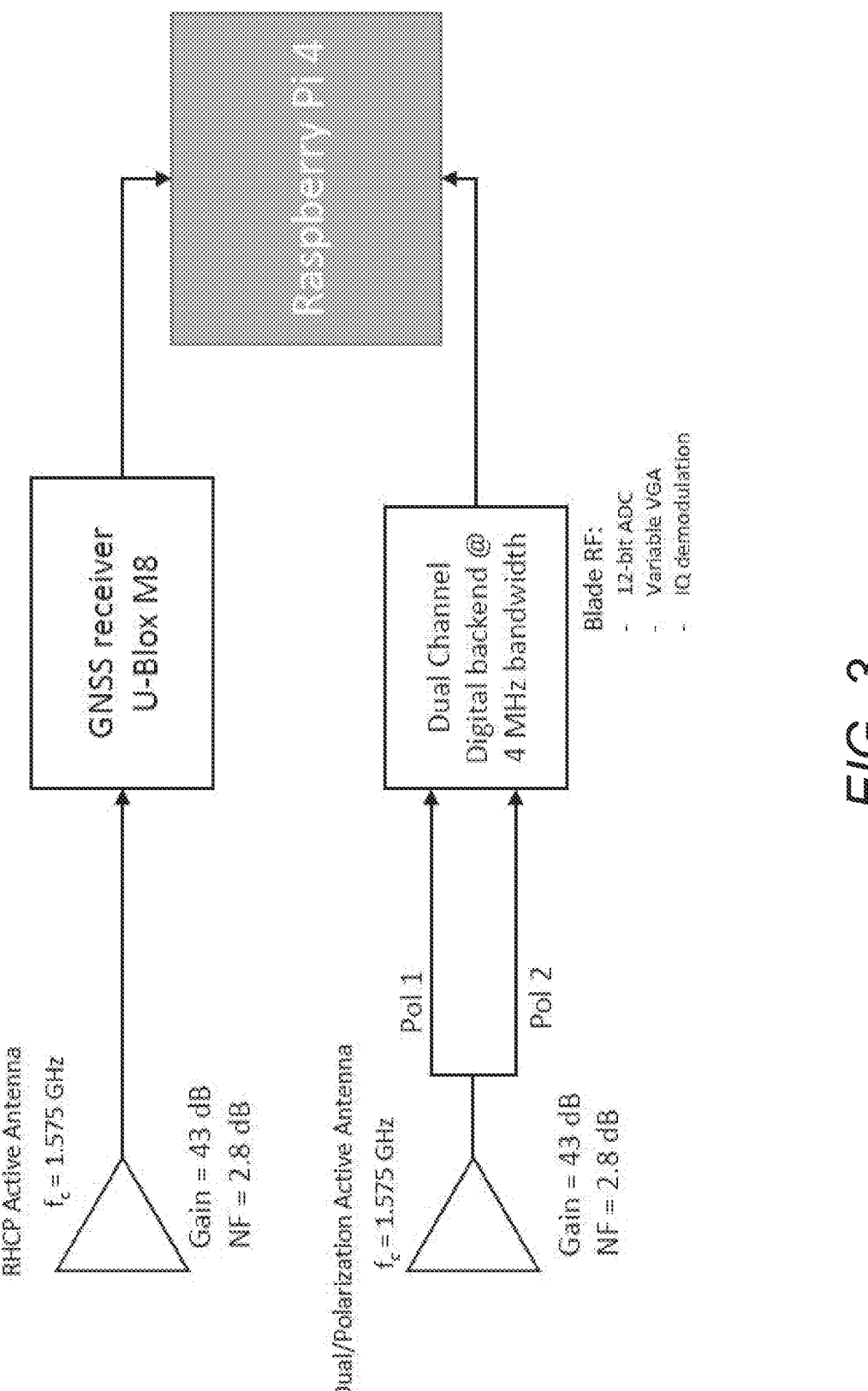
FIG. 3 illustrates a block diagram of a reflectometer in accordance with an embodiment of the invention.

FIG. 3 illustrates a block diagram of a reflectometer in accordance with an embodiment of the invention. In numerous embodiments, reflectometers include at least a GNSS receiver coupled to a right-hand circular polarization (RHCP) active antenna. In several embodiments, the RHCP active antenna receives GNSS signals that can be used to position the MC2 system and/or the vehicle carrying the MC2 system. In certain embodiments, the GNSS receiver is a U-Blox M8 receiver. Reflectometers may include a dual-channel digital backend connected to a dual polarization active antenna. In several embodiments, the dual polarization active antenna is configured to collect the horizontally and vertically polarized GNSS signals scattered upon reflecting off of the observed surface. In some embodiments, the dual channel digital backend that processes data collected by the dual polarization active antenna operates at 4 MHz bandwidth. Both the RHCP active antenna and Dual Polarization Active Antenna may have the same resonant frequency at 1.575 GHz. In certain embodiments, a receiving analog back-end connected to the antennas can provide a gain of 43 dB with a noise figure of 2.8 dB. Digital backends in some embodiments may be a Blade RF with a 12-bit analog-to-digital converter. Digital backends may further include variable gain amplifiers.

Although a specific example of a reflectometer is illustrated in this figure, any of a variety of reflectometers can be utilized to process GNSS-R signals similar to those described herein as appropriate to the requirements of specific applications in accordance with embodiments of the invention.

Figure 4:
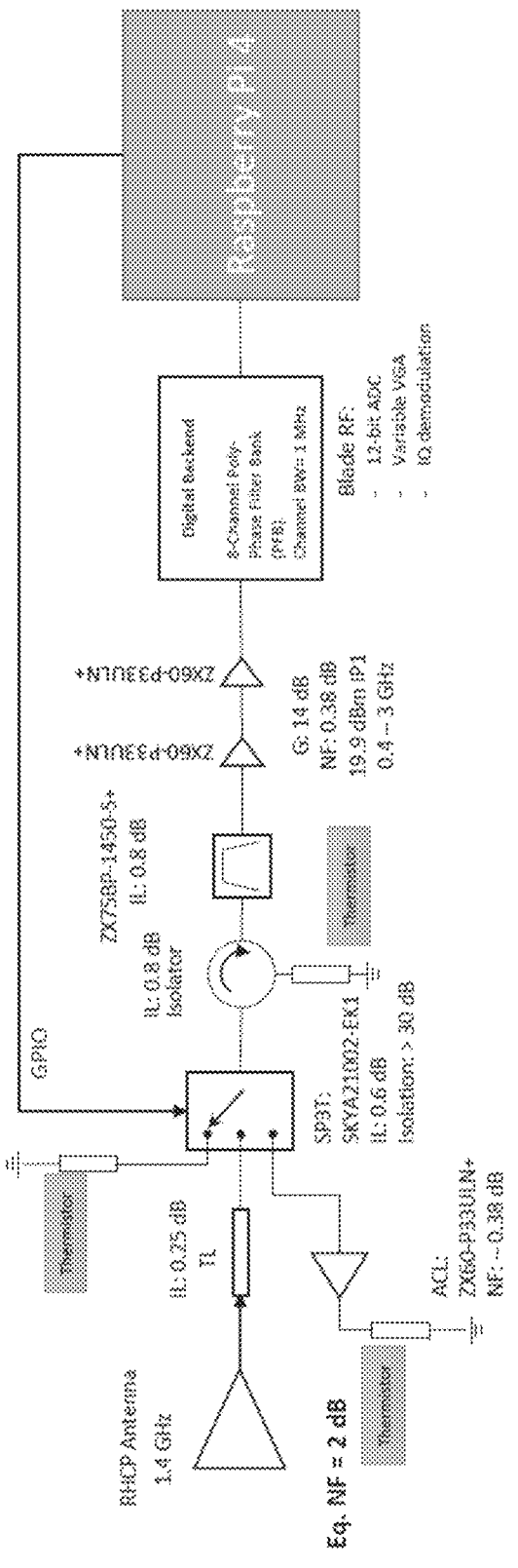
FIG. 4 illustrates a block diagram of a radiometer in accordance with an embodiment of the invention.

FIG. 4 illustrates a block diagram of a radiometer in accordance with an embodiment of the invention. Radiometers can collect data that may be used to obtain the surface thermal emission of the reflecting surface. In several embodiments, radiometers include a digital backend. The digital backend may be a 32-channel poly-phase filter bank (PFB) with a channel bandwidth of 1 MHz, covering the 1413 MHz band with ±14 MHz bandwidth. The radiometric calibration approach may be based on a single pole three throws (SP3T) switch commuting between the antenna, a thermally monitored matched load, and an active cold load based on a calibrated matched-input Low Noise Amplifier (LNA).

Although a specific example of a radiometer is illustrated in this figure, any of a variety of radiometers can be utilized to monitor surface emissions similar to those described herein as appropriate to the requirements of specific applications in accordance with embodiments of the invention.

In numerous embodiments, MC2 systems include a software-defined radio (SDR) board that processes the RF data and conducts In-phase/Quadrature (I/Q) demodulation. The direct reflectometer antenna can be connected to a standard GNSS receiver, which extracts data needed for calibration of the reflectometer reflected signal. The I/Q demodulated data for the radiometer and the reflectometer GNSS reflected signal, and the reflectometer GNSS direct signal can be sent to a common onboard computer.

SDR software has been developed to process data from all instruments. Data-processing processes can be implemented in the onboard processing unit to transform in real-time the measured raw data (I/Q samples) into brightness temperatures, reflectivity, near-infrared data, and/or thermal infrared data, i.e., L1-band data. SDR could be ported to FPGA code if necessary for a space mission. Digital backends are not limited to the functionalities of MC2, as other conventional back-ends may be substituted into MC2 as well. In addition, processing and retrieval software can ingest L1-band data and produce higher-level products (i.e., soil moisture, vegetation water content, fire risk indices, irrigation needs indices, and flood/drought indices).

Although a specific configuration of an SDR is illustrated in this figure, any of a variety of configurations can be utilized, and the specific SDR configuration that is utilized will largely be dependent upon the requirements of specific applications in accordance with embodiments of the invention.

Processes enabling systems to integrate and utilize data captured from the various sources discussed above will be described in the following section.

Data Processing and Fire Surveillance and Observational Sensors (FireSOS)

In many embodiments, systems provide a novel fusion algorithm that is capable of integrating the data collected from the many antennas and cameras in MC2 described above and provide a comprehensive output describing the condition of the observed surface as well as surrounding environments. The data processing algorithm, hereinafter referred to as FireSOS, can obtain critical information on the Earth's surface, including but not limited to SMC, BMF, and TC from GNSS-R signals. In several embodiments, the obtained information, such as SMC, BMF, and TC, can be used to build FRI maps that serve firefighters and wildfire management agents to help improve decision-making during a wildfire's lifecycle. FireSOS can provide information that helps the management of biomass fuels to reduce their availability to feed a wildfire, either pre- or during the event, by pinpointing areas of arid vegetation with low soil moisture content. FireSOS can also assist with identifying areas of potential widespread wildfire given soil and biomass fuel conditions during a wildfire event, facilitating improved wildfire suppression strategies. FireSOS can be deployed to survey areas pre- and/or post-wildfires, assessing the damage caused to the biomass and the condition/health of the remaining biomass and the soils in pro of future restoration activities.

Figure 5:
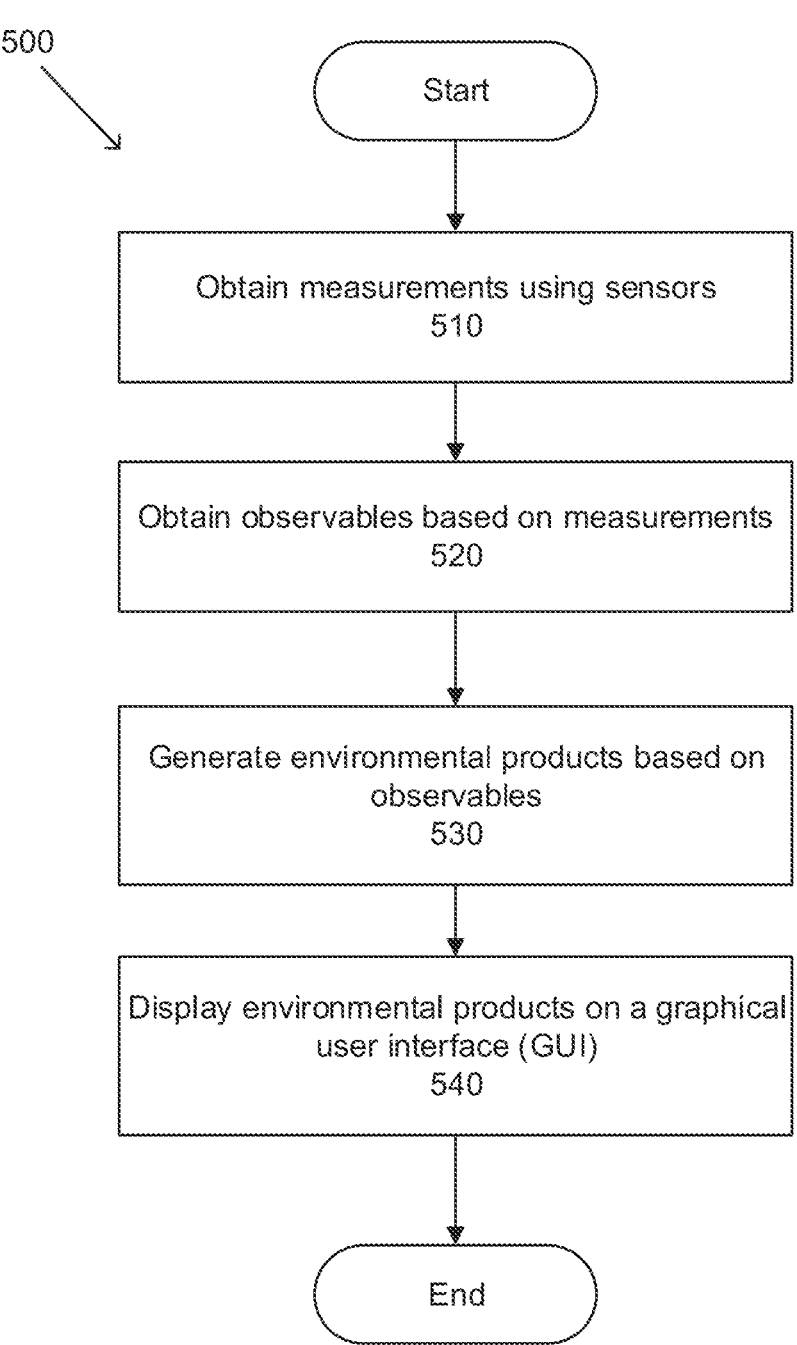
FIG. 5 illustrates a process for evaluating a surface of interest in accordance with an embodiment of the invention.

A process for evaluating a surface of interest in accordance with an embodiment of the invention is illustrated in FIG. 5. Process 500 obtains (510) measurements using sensors. In many embodiments, FireSOS enables optical/thermal/spectral sensors to operate in situations where tall canopy layers and heavy smoke are present that can hinder observation from altitude. In numerous embodiments, reflectometers, and radiometers can simultaneously estimate surface soil moisture and vegetation water content.

Process 500 can obtain (520) observables based on the measurements. The main observables are soil moisture (SM), NDVI, vegetation water content (VWC), surface roughness, volume scattering, reflectivity, coherency, and canopy temperature. Observables may be calculated by a combination of one or more measurements.

Process 500 can generate (530) environmental products based on the observables. In many embodiments, the main products that aid with wildfire evaluation are SMC, BF, TC, and FRI.

Process 500 can display (540) environmental products on a graphical user interface (GUI). Environmental products may be displayed on a map shown in a GUI, which can indicate to relevant personnel the precise locations with the most severe fires.

While specific processes for evaluating a surface of interest are described above, any of a variety of processes can be used to evaluate surfaces of interest as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

In some embodiments, FireSOS can quantify the amount of volume scattering using the polarimetric nature of the reflectometer, which provides systems with the ability to pinpoint areas where low vegetation is present. For example, organic matter, such as shrubs and small bushes, may often be present underneath the taller trees in a forest environment. The trees' moisture may not be necessarily correlated to the moisture of the shrubs because their roots reach different depths. L-band reflectometry and radiometry can measure surface soil moisture down to several centimeters (~20 cm for dry soil conditions and ~2-5 cm for wet soil conditions). This can allow the measurements of the health of shrubs, forbs, and grass, which are correlated to the surface soil moisture estimated by L-band measurements. On the other hand, the moisture content of tall canopies, which may be measured by multi-spectral imagery, is the result of the roots accessing deeper water sources and is correlated to the moisture of deeper layers, e.g., groundwater. In numerous embodiments, systems can combine tall canopy moisture retrieval from the optical/thermal/spectral data and surface soil moisture retrievals from the L-band data to measure the health of dense canopy and the shrubs beneath the canopy layer directly. The use of polarimetric L-band forward scattered data can be important for estimating surface soil moisture beneath the dense canopy, as by geometry, it is not affected by double bounce reflection, and it is directly correlated to the health of the immediate shrub layer.

In many embodiments, L-band radiometry measures the brightness temperature of the received signals, and the measurements can be calibrated using a two-load calibration procedure, which compares an active cold load with a matched load at a known physical temperature. Reflectometers in MC2 systems can also be calibrated using processes including (but not limited to) the processes for calibration of reflectometers, GNSS-R signals, and Stokes parameter computation described in U.S. patent application Ser. No. 18/489,802, the disclosure of which is incorporated by reference above in its entirety. In selected embodiments, the Stokes parameters of the reflected GNSS-R signals can be obtained and calibrated for total intensity and antenna pattern. The normalized bistatic radar cross-section ($\sigma_0$) can be computed using conventional techniques. Imagery products may be internally calibrated by the cameras, which are commercial off-the-shelf products with already integrated calibration procedures.

In many embodiments, NDVI and VWC are retrieved from the multi-spectral camera. NDVI is defined as $$NDVI = \frac{NIR\ (790\ \text{nm}) - \text{Red}\ (660\ \text{nm})}{NIR\ (790\ \text{nm}) + \text{Red}\ (660\ \text{nm})}.$$

VWC can be modeled from the NDVI. Volume scattering (VS) and signal coherency may be retrieved based on the four GNSS-R Stokes parameters $S_{\{0,1,2,3\}}$ obtained from the computed DDMs of the reflected GNSS-R signals. Given the very small dispersion of the DDM in an airborne scenario, in many embodiments, a single value of the Stokes parameters is selected at the peak position of $S_0$, representing the total intensity DDM. The amount of volume scattering produced by the vegetation is computed as the degree of polarization (DOP). VS is proportional to DOP and the normalized bistatic radar cross-section, a $\sigma_0$. Hence, for a completely polarized wave, DOP=1, and VS=0. For a completely depolarized wave due to vegetation volume scattering, DOP~0 and VS~$\sigma_0$.

Canopy temperature can be directly measured from the thermal camera when a sufficient amount of vegetation is present. Moderate vegetation may be flagged using the NDVI as a reference product, and canopy temperature can be provided over those regions. Over non-vegetated regions, thermal images can provide bare soil temperature.

Surface roughness can be retrieved by minimizing a semi-empirical model applied to polarimetric GNSS-R data. This method can achieve a higher spatial resolution and a more significant number of points compared to the L-band radiometer. The polarimetric reflectometer data may be used to directly estimate the soil moisture values in specular reflection point locations. In numerous embodiments, soil moisture is retrieved by minimizing the difference between the ratio of two polarimetric GNSS-R components and the ratio of Fresnel reflection coefficients modeled using a soil dielectric constant model (e.g., Topp model, Mironov model, or Dobson model). Since there is a negligible double bounce scattering, the measured bistatic radar cross-section may be most sensitive to the soil, attenuated by the vegetation volume scattering. Finally, once the soil moisture is obtained, the semi-empirical roughness can be estimated by isolating the term using the estimated VWC from the multi-spectral imagery.

In many embodiments, full-coverage high-resolution soil moisture is obtained by combining imagery data from the thermal and multi-spectral cameras, roughness data from the reflectometer, and brightness temperature data from the radiometer. A simplified $\tau$–h model can be implemented from the $0^{th}$-order radiative transfer equation as:

$$T_B = T_s \gamma_{n,m}(1 - \Gamma_{n,m}(h,\text{SM})) + T_{v_{n,m}}((1 - \gamma_{n,m}) + \Gamma_{n,m}(h,\text{SM}) \Gamma_{n,m}(1 - \gamma_{n,m})) \quad (1)$$

where $T_B$ is the average brightness temperature of a given region measured by an L-band radiometer, $T_s$ is the estimated surface temperature, interpolated from non-canopy areas, $\gamma_{n,m}$ is the canopy transmissivity, from VWC, at a pixel (n,m), $T_{v_{n,m}}$ is the canopy layer temperature at a given pixel (n,m), and $\Gamma_{n,m}(h,\text{SM})$ is the average soil reflectivity at an image pixel for a given: roughness, h, and soil moisture, SM. Reflectivity $\Gamma_{n,m}$ can be interpolated from the roughness coefficient of the observed region, and the soil moisture minimization algorithm can be retrieved using the values retrieved for all pixels using the Fresnel reflection coefficients for soil modeled through a soil dielectric model.

Moderate-resolution soil moisture over selected reflection points can be estimated. In some embodiments, systems can obtain polarimetric GNSS-R soil moisture as a comparison or whenever other measurements are unavailable, such as in the presence of smoke, fire, or poor illumination conditions.

In numerous embodiments, SMC is obtained from SM by providing a simple classification based on further inputs describing the surrounding conditions, ranging from very dry to wet. BF may be estimated from two parameters sensitive to the vegetation: VWC, and VS. In some embodiments, BF can be provided as a simple classification based on the inputs regarding the dryness of the surrounding area. TC may be computed by aggregating the reflectometry measurements from consecutive passes over the interest region by providing a classification based on the conditions of the surrounding area.

FRI can be computed by combining SMC, BF, and TC. In certain embodiments, fire risk ranges from 0 to 7, with 0 considered low risks and 7 very high risks. SMC, BF, and TC may be combined with a non-linear regression to estimate the FRI:

$$FRI = f(SMC, BF, TC) \quad (2)$$

where $f(\ )$ is a function that can be derived using data-driven modeling from satellite (SMAP, SMAP-R, MODIS, and GEDI data) and FireSOS measurements from field campaigns to estimate FRI from the three products generated.

MC2 and FireSOS focus on real-time processing. In many embodiments, systems function on a moderate data rate satellite modem (~256 kbps). In certain embodiments, a low-rate budget (2.4 kbps) could be used to facilitate connections for data processing. This can allow for the streaming of radiometry and reflectometry data, which fit well in a low-budget satellite communication plan. Different modes of operation can be defined depending on the link availability. In several embodiments, a satellite-based radio link such as Iridium or Globalstar can be used as the connection mechanism, offering data rates up to 256 kbps, suitable for the amount of data generated by the instrument. MC2 can generate radiometry and reflectometry measurements at 1-2 Hz, and images from the multi-spectral and thermal cameras every 30 seconds at 1.2 Mpx and 0.28 Mpx resolution, respectively. The expected data rate for the radiometer and reflectometer may be below 1 kbps, including housekeeping data. The data rate for the images may be between ~1.08 Mbps (8-bit resolution, no compression) and ~300 kbps for reduced spatial resolution (1.2 Mpx upscaled to 0.28 Mpx). The onboard processing products data rate may be between 37 kbps and 150 kbps, depending on the flight altitude.

Although specific data rates and image resolutions are discussed above, any of a variety of data rates and image resolutions can be utilized, and the specific data rates and image resolutions that are utilized will largely be dependent upon the requirements of specific applications in accordance with embodiments of the invention.

In numerous embodiments, the optical imagery is stored as Geographic Information System (GIS) Raster entries that allow for multiple resolutions. GNSS-R and L-band radiometry measurements can be stored as simple GIS features. In several embodiments, observables generated from the measurements can be stored in a database with Geographic Information System (GIS) capabilities, as for instance, Post-GIS. The observables can be transformed into products as part of the Real Time Visualization Tool (RTVT).

In many embodiments, RTVT's algorithm generates a standard grid given the plane telemetry information and height for a given time period. A standard grid can be selected, and the RTVT can generate SM maps, TC maps, and BMF maps. In a variety of embodiments, high spatial resolution SM maps can be obtained by solving the Tau-Omega model. In some embodiments, FRI maps are generated based on SM, TC, and BMF. All four products can be saved as GIS-enabled raster files. These raster files can be easily accessed via a web interface (e.g., using Leaflet API) or any GIS visualization software, such as QGIS.

Network Implementation

Figure 6:
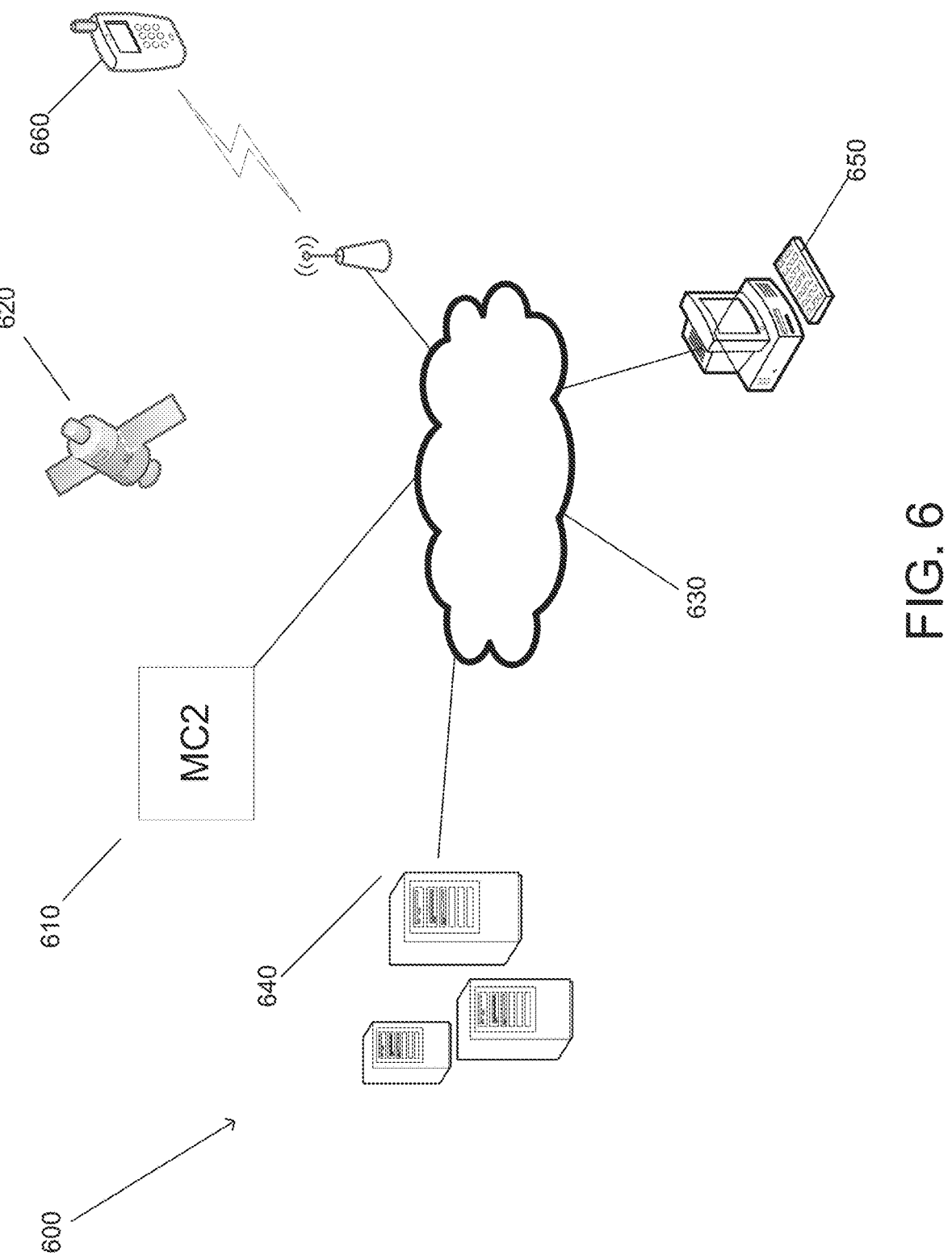
FIG. 6 illustrates a system architecture for surface evaluation in accordance with an embodiment of the invention.

FIG. 6 illustrates a system architecture for surface evaluation in accordance with an embodiment of the invention. In several embodiments, system 600 includes an MC2 system 610. MC2 systems may be deployed on aerial vehicles. MC2 may include GNSS receivers that can be configured to process received GNSS signals. System 600 includes at least one satellite 620. In many embodiments, the at least one satellite is capable of transmitting GNSS signals onto a surface where the MC2 system is seeking to monitor. In many embodiments, MC2 can connect to a cloud network 630. Satellites can include both transmitters and receivers that are capable of transmitting GNSS signals and receiving GNSS signals reflected off of surfaces. In many embodiments, MC2 includes at least a pair of orthogonally linear polarized antennae configured to pick up reflected GNSS signals in horizontal and vertical components. Satellites can be configured with HCP GNSS systems to better determine the positions of MC2 as well as the observed area through GNSS signals. Satellites can also be used to determine the positions of other computing devices. MC2 may receive input from computing devices 650, which may be additional commands for MC2 to perform in its moisture content detection. In selected embodiments, computing devices include mobile devices 660. Mobile devices can send commands to control the functions of MC2. In some embodiments, system 600 includes servers 640. MC2 can obtain data such as map data of the area being observed from servers 640. Servers 640 may include a records database or repository.

Processes that provide the methods and systems for positioning in accordance with some embodiments are executed by a computing device or computing system, such as a desktop computer, tablet, mobile device, laptop computer, notebook computer, server system, and/or any other device capable of performing one or more features, functions, methods, and/or steps as described herein.

Figure 7:
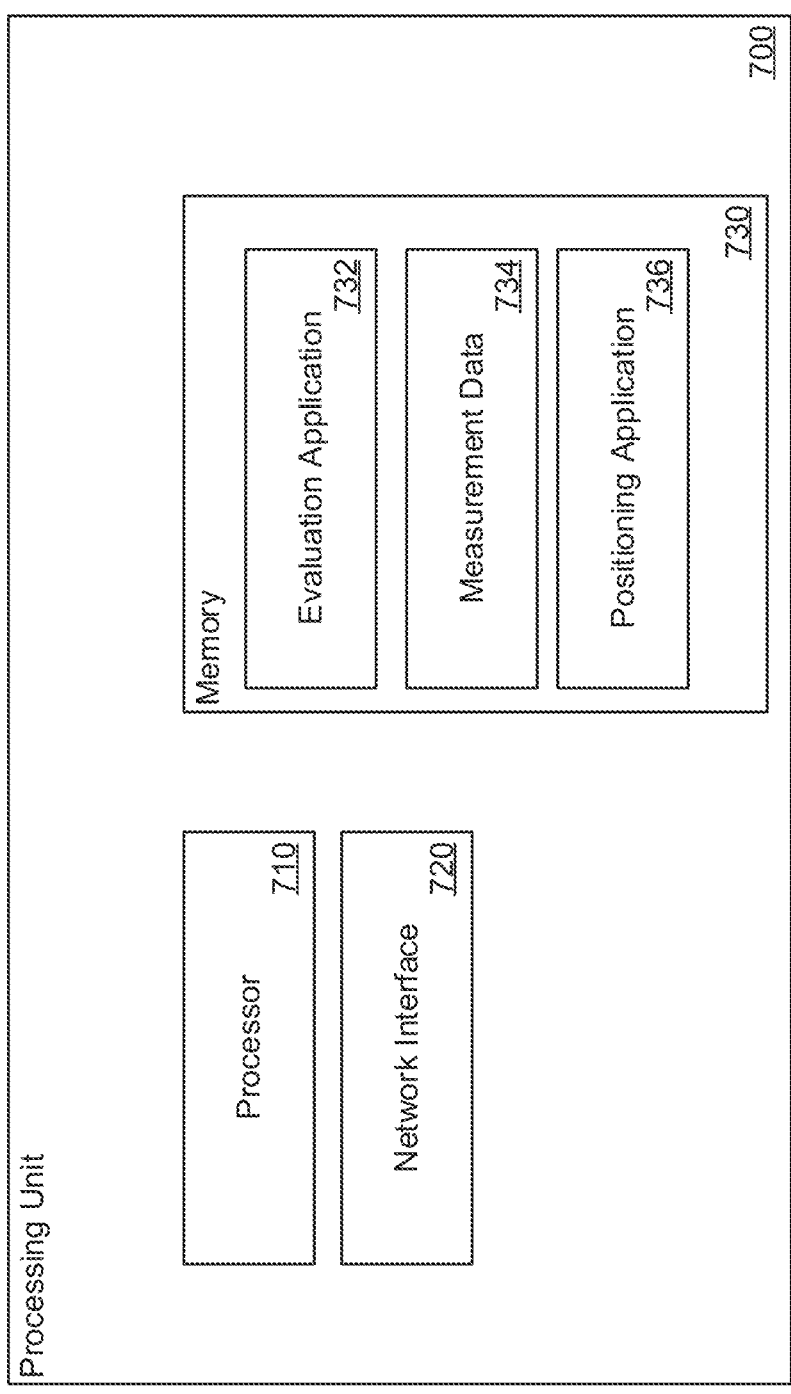
FIG. 7 illustrates a processing unit that can be utilized to evaluate surfaces of interest in accordance with an embodiment of the invention.

FIG. 7 illustrates a processing unit that can be utilized to evaluate surfaces of interest in accordance with an embodiment of the invention. Processing unit 700 may be deployed onboard the MC2. Processing unit 700 includes a processor 710. Processor 710 may direct evaluation application 732 to measure and evaluate the surface being observed. Processing application can be configured to perform a calibration process such as (but not limited to) the various calibration processes described above. Once the calibration process is performed, the calibration information can then be used by positioning application 736 to perform location measurements. Evaluation application 732 and positioning application 736 can be stored in memory 730. Data obtained through sensors on MC2 can be stored in measurement data 734.

In many embodiments, processor 710 can include a processor, a microprocessor, a controller, or a combination of processors, microprocessor, and/or controllers that performs instructions stored in a memory 730 to classify and detect gastroparesis. Processor instructions can configure the processor 710 to perform processes in accordance with certain embodiments of the invention. In various embodiments, processor instructions can be stored on a non-transitory machine-readable medium. Processing unit 700 further includes a network interface 720 that can receive various types of data from external sources.

Although a specific example of a processing unit is illustrated in this figure, any of a variety of processing units can be utilized to evaluate a surface of interest similar to those described herein as appropriate to the requirements of specific applications in accordance with embodiments of the invention.

In accordance with still other embodiments, the instructions for the processes can be stored in any of a variety of non-transitory computer-readable media appropriate to a specific application.

Although specific methods of surface evaluation are discussed above, many different methods of surface evaluation can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A system for high-resolution moisture content detection and surface evaluation, the system comprising:
   a set of one or more antennas;
   a radiometer;
   a reflectometer;
   a set of one or more cameras;
   a Global Navigation Satellite System (GNSS) receiver;
   a memory containing an evaluation application; and
   a processor comprising a set of one or more processors, wherein the evaluation application configures the set of one or more processors to evaluate a surface underneath the system by performing the steps of:
      obtaining a plurality of measurements using the radiometer, the reflectometer, and the set of one or more cameras;
      obtaining a set of one or more observables based on the plurality of measurements at a high spatial resolution;
      generating a set of one or more environmental products based on at least one observable from the set of one or more observables; and
      displaying the set of one or more environmental products on a graphical user interface (GUI).

2. The system of claim 1, wherein the radiometer is an L-band radiometer centered at 1.413 GHz.

3. The system of claim 1, wherein the reflectometer is a full polarimetric multi-band GNSS reflectometer that receives signals in the L1, L2, and L5 GPS bands, and E1 and E5 Galileo bands.

4. The system of claim 1, wherein the set of one or more cameras are multi-spectral cameras with sensitivities at 550 nm, 660 nm, 735 nm, and 790 nm bands.

5. The system of claim 1, wherein the obtaining of the plurality of measurements comprises receiving Global Navigation Satellite System Reflectometry (GNSS-R) signals reflected off of the surface.

6. The system of claim 1, wherein obtaining the set of one or more observables further comprises computing Delay Doppler Maps of both polarizations of received GNSS-R signals.

7. The system of claim 1, wherein the set of one or more antennas comprises a right-hand circular polarization (RHCP) active antenna, and a Dual Polarized Antenna.

8. The system of claim 1, wherein the radiometer further comprises a digital backend comprising an 8-channel polyphase filter bank with a channel bandwidth from 1 to 4 MHz.

9. The system of claim 1, wherein the radiometer is calibrated using a single pole three throws switch commuting method.

10. The system of claim 1, further comprising a software-defined radio (SDR) board that demodulates received GNSS-R signals using in-phase/quadrature (I/Q) demodulation.

11. The system of claim 1, wherein the observables of the surface comprises at least one observable selected from the group consisting of: soil moisture (SM), normalized difference vegetation index (NDVI), vegetation water content (VWC), surface roughness, volume scattering, reflectivity, signal coherency, and canopy temperature.

12. The system of claim 1, wherein the environmental products comprise at least one selected from the group consisting of: soil moisture condition (SMC), biomass fuel (BF), terrain classification (TC), and fire risk index (FRI).

13. The system of claim 1, wherein the radiometer brightness temperature measurements are calibrated using a two-load calibration procedure.

14. The system of claim 11, wherein the NDVI and VWC are computed based on measurements from the set of one or more cameras.

15. The system of claim 11, wherein the volume scattering and signal coherency is computed based on four Stokes parameters of the received GNSS-R signals.

16. The system of claim 11, wherein the surface roughness can be computed by minimizing a semi-empirical model applied to received polarimetric GNSS-R data.

17. The system of claim 11, wherein the SM is computed by minimizing the difference between the ratio of polarimetric GNSS-R components and the ratio of Fresnel reflection coefficients modeled using a soil dielectric model.

18. The system of claim 12, wherein the FRI is computed by fitting the SMC, BF, and TC in a non-linear regression.

19. The system of claim 11, wherein a high spatial resolution SM map is obtained by solving the Tau-Omega model.

20. A system for high-resolution moisture content detection and surface evaluation, the system comprising:
   a set of one or more antennas;
   a radiometer;
   a reflectometer, wherein the reflectometer is a full polarimetric multi-band GNSS reflectometer that receives signals in the L1, L2, and L5 GPS bands, and E1 and E5 Galileo bands;
   a set of one or more cameras;
   a GNSS receiver;
   a memory containing an evaluation application; and
   a processor comprising a set of one or more processors, wherein the evaluation application configures the set of one or more processors to evaluate a surface underneath the system by performing the steps of:
      obtaining a plurality of measurements using the radiometer, the reflectometer, and the set of one or more cameras;
      obtaining a set of one or more observables based on the plurality of measurements at a high spatial resolution, wherein the set of observables comprises at least one observable selected from the group consisting of: soil moisture (SM), normalized difference vegetation index (NDVI), vegetation water content (VWC), surface roughness, volume scattering, reflectivity, signal coherency, and canopy temperature;
      generating a set of one or more environmental products based on at least one observable from the set of one or more observables; and
      displaying the set of one or more environmental products on a graphical user interface (GUI).

21. A system for detecting moisture content of a surface, the system comprising:
   a set of one or more antennas configured to receive GNSS-R signals reflected off of the surface;
   a radiometer configured to measure emissions of the surface;
   a reflectometer configured to process the received GNSS-R signals;
   a set of one or more cameras configured to obtain infrared data of the surface; and
   a GNSS receiver configured to position the system based on received GNSS signals.

22. The system of claim 21, wherein at least one of the measured emission, processed GNSS-R signals, infrared data, and the position is further processed by a separate processor.

23. The system of claim 7, wherein the set of one or more antennas are nadir-looking planar antenna arrays.

24. The system of claim 23, wherein the boresight maxima of the antennas covers reflections coming from incidence angles from 35° to 55°.

\*    \*    \*    \*    \*